Figure 1:
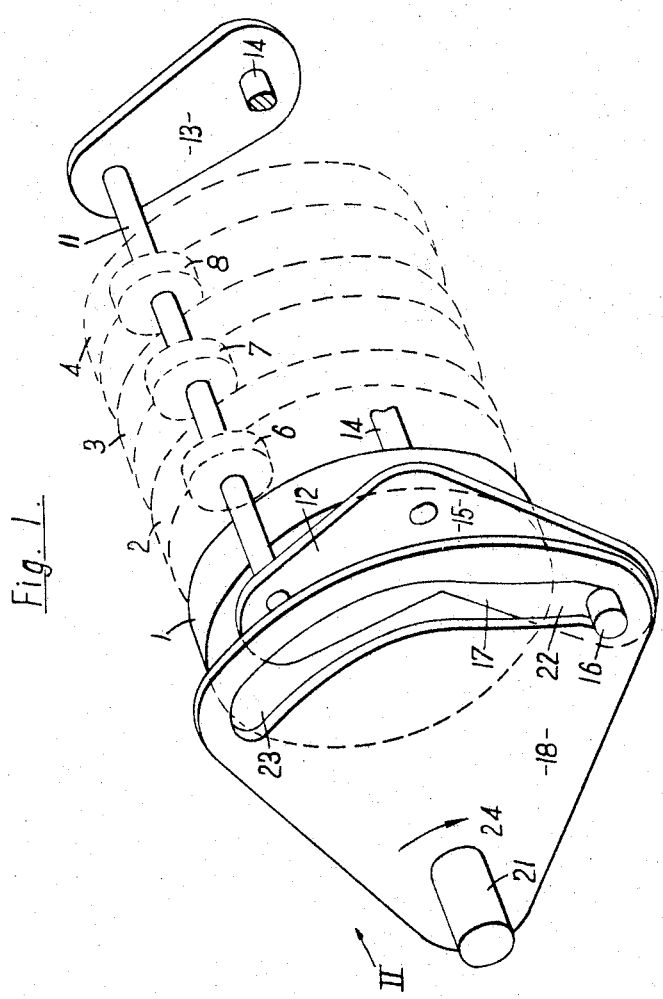

July 4, 1967 L. F. DALLEN 3,329,338
COUNTING MECHANISMS

Filed March 12, 1965 2 Sheets-Sheet 1

Inventor
LESLIE FREDERICK DALLEN

By Nolte & Nolte
Attorneys

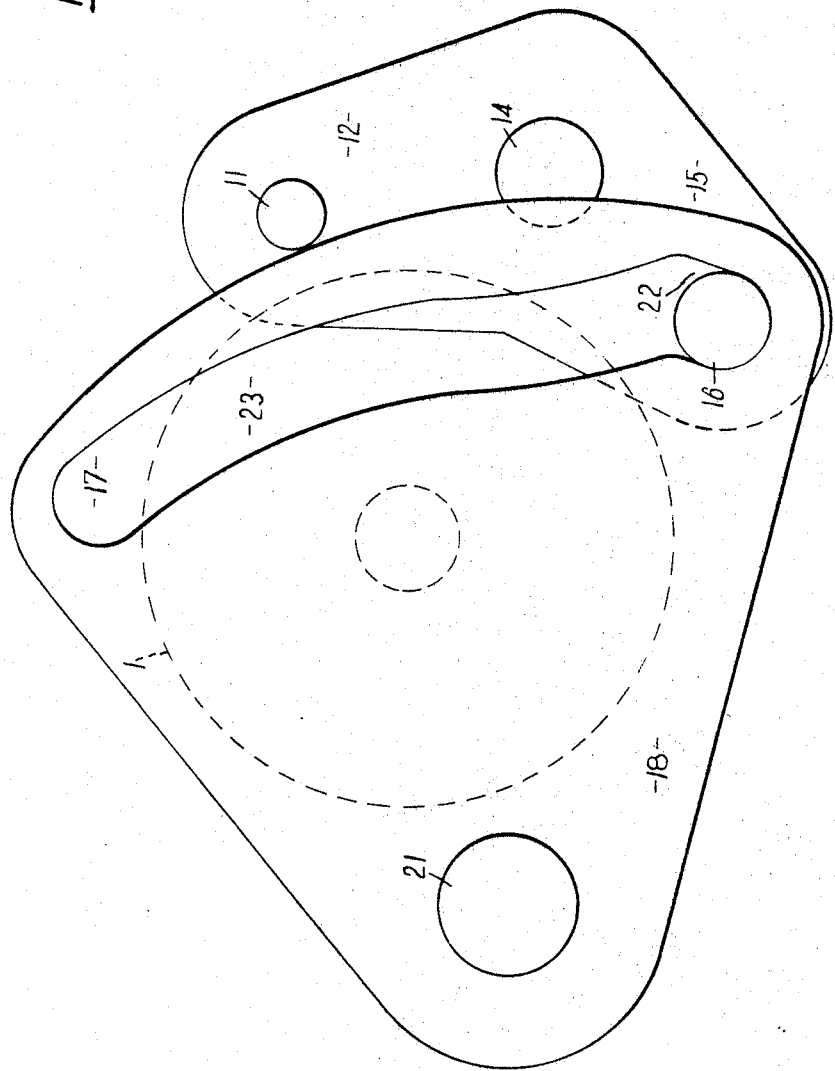

12,329,338
COUNTING MECHANISMS
Leslie Frederick Dallen, London, England, assignor to English Numbering Machines Limited, Enfield, England, a British company
Filed Mar. 12, 1965, Ser. No. 439,403
Claims priority, application Great Britain, Apr. 2, 1964, 13,564/64
6 Claims. (Cl. 235—139)

The invention relates to counting mechanisms.

Counting mechanisms are known which have a plurality of indicating wheels, which may bear numerical indications. A drive is applied to one wheel, usually a wheel bearing numerical indications which are allocated to the lowest order decade of the count. The indicating wheels have a common axis of rotation and apart from the first wheel of the series, each wheel has at one face a toothed rim, which extends towards the adjacent face of the preceding wheel. Apart from the last wheel of the series, each wheel moreover has a group of two teeth on its other face, which extend towards the toothed rim of the succeeding wheel. Transfer pinions are rotatably provided on a shaft which extends parallel to the axis of rotation of the indicating wheels, there being one less transfer pinion than the number of indicating wheels. Each pinion has an even number of teeth and alternate teeth are axially shorter than the remaining teeth. The pinions normally mesh with the toothed rims of the indicating wheels, and their longer teeth are engageable by the groups of two teeth on the indicating wheels, when the respective indicating wheels reach the decade transfer position. Each pinion thus serves to advance one of the indicating wheels by one step whenever the preceding indicating wheel completes a revolution.

In connection with such known counting mechanisms, when it is desired that the indicating wheels can be re-set to zero or to a predetermined indication, it is necessary first for the transfer pinions to be moved out of mesh with the indicating wheels. Thereafter, known re-setting means, such as cams or gear drives are used for rotating the indicating wheels to the re-set or other predetermined positions. Usually, the transfer pinion shaft is simply mounted by a rockable lever and is urged by spring means into a position in which the transfer pinions are in mesh with the indicating wheels. It has been found, however, especially with a high counting rate and thus with frequent operation of the transfer pinions, that the transfer pinion shaft is liable to translational vibration, with the result that one of the indicating wheels may turn through one or more teeth pitches of its toothed rim, during a temporary unintended disengagement of the relevant transfer pinion from the said toothed rim, so that incorrect indications are given by the indicating wheels, or accuracy of alignment of the indications given by the respective indicating wheels is lost.

It is an object of the invention to avoid incorrect indications of a counting mechanism, which are due to translational movement of the pinion shaft.

It is another object of the invention to improve the accuracy of alignment of the indications given by the indication wheels.

These and other objects and advantages of the invention will become apparent to those skilled in the art from the following description of the invention when read with reference to the accompanying diagrammatic drawings, which are given by way of example and in which:

FIG. 1 is a perspective view of a counting mechanism, showing an arrangement for de-meshing the transfer pinions of the counting mechanism; and FIG. 2 is a view in the direction of the arrow II of FIG. 1.

The counting mechanism of FIG. 1 comprises four indicating wheels 1, 2, 3 and 4 which are rotatably mounted on a common shaft, not shown. The indicating wheels bear numerical indications, not shown, wheel 1 being allocated to the units decade, wheel 2 to tens, wheel 3 to hundreds and wheel 4 to thousands.

Known gear tooth means, not shown, are provided on the mutually facing regions of wheels 1 and 2, 2 and 3, 3 and 4, and these gear tooth means are respectively engaged by transfer pinions 6, 7 and 8 for the purpose of effecting decade transfer in known manner between the wheels. That is to say, transfer pinion 6 advances wheel 2 by one step when wheel 1 completes one revolution, transfer pinion 7 advances wheel 3 by one step when wheel 2 completes one revolution, and transfer pinion 8 advances wheel 4 by one step when wheel 3 completes one revolution.

The transfer pinion 6, 7 and 8 are freely rotatably mounted on a shaft 11 which extends parallel to the axis of rotation of the indicating wheels 1, 2, 3 and 4. The shaft 11 extends between rocker levers 12 and 13 which are pivoted on a frame of the mechanism by a pivot shaft 14. Rocker lever 12 is in the form of a double-armed lever and, at its arm 15 remote from the shaft 11, carries a stud 16.

The stud 16 engages in a cam track 17 in an actuating segment 18 which has an operating shaft 21. The segment 18 can be rotatably rocked by the shaft 21 and is also mounted in the frame of the mechanism thereby.

The cam track 17 has a region 22, at one end, which is of constant radius from the axis of the operating shaft 21, and then a region 23 which decreases in radius from the axis of the operating shaft 21. The region 22 is so disposed that when, as illustrated, the stud 16 is in engagement with the said region 22, the rocker lever 12 is held in such a position that the transfer pinions 6, 7 and 8 are in the correctly meshing position with regard to the indicating wheels. Any tendency of the transfer pinions to impart translational movement to the shaft 11 is thus resisted, since the shaft 11 is held fixed as a result of locking of the rocker lever 12 by the cam track region 22.

Since the region 23 of the cam track 17 decreases in radius from the operating shaft 21, then if the segment 18 is swung in the direction of the arrow 24 (FIG. 1), the rocker lever 12 is swung clockwise, as viewed in FIG. 1, about the axis of the pivot shaft 14, and consequently the transfer pinions 6, 7 and 8 are withdrawn from engagement with the indicating wheels 1, 2, 3 and 4.

In certain applications of counting mechanisms, the numerical indications are given by wheels which are connected by gear means to the wheels (such as wheels 1, 2, 3, and 4 of FIG. 1) which are interconnected by a transfer pinion arrangement. This frequently enables a more convenient positioning of the wheels which give the numerical indications, than is possible if the wheels which are interconnected by the transfer pinions are directly used for giving the numerical indications. The expression "indicating wheels" as used herein is intended to mean the wheels which are interconnected by the transfer pinions, regardless of whether they are provided with numerals or other indicia or are connected by gear means to further wheels which are provided with numerals or other indicia.

It should be clearly understood that the embodiment described and illustrated is given by way of example only, and that modifications, omissions and additions are possible without departing from the spirit of this invention.

I claim:

1. A counting mechanism comprising a plurality of indicating wheels mounted for rotation about a common axis, gear means carried by said indicating wheels, a transfer pinion arranged for meshing with said gear means of two successive indicating wheels to effect a scaled-down rotation transfer between said successive indicating wheels, locking means for preventing unintentional translatory movement of the axis of rotation of said transfer pinion during operation of said counting mechanism, a shaft lockable by said locking means, said transfer pinion being mounted for rotation on said shaft, a pivotally mounted lever, said shaft being carried by said pivotally mounted lever by movement of which said pinion is movable out of and into a position for meshing with said gear means.

2. A counting mechanism comprising a plurality of indicating wheels mounted for rotation about a common axis, gear means carried by said indicating wheels, a transfer pinion arranged for meshing with said gear means of two successive indicating wheels to effect a scaled-down rotation transfer between said successive indicating wheels and locking means for preventing unintentional translatory movement of the axis of rotation of said transfer pinion during operation of said counting mechanism, wherein said locking means comprise cam means.

3. A counting mechanism as defined in claim 2, and comprising a pivotally mounted lever, said shaft being carried by said pivotally mounted lever by movement of which said pinion is movable out of and into a position for meshing with said gear means, said cam means having a rockably mounted member, a projection on said pivotally mounted lever, said projection engaging a cam track of said rockably mounted member, said cam track being such that on rocking of said rockably mounted member said lever is swung from a position in which said pinion is in mesh with said gear means into a position in which said pinion is withdrawn from mesh with said gear means.

4. A counting mechanism as defined in claim 3, wherein said cam track is a cam slot in said rockably mounted member, said projection comprising a stud on said pivotally mounted lever.

5. A counting mechanism as defined in claim 4, wherein said pivotally mounted lever is a double-armed lever, one arm carrying said transfer pinion shaft and the other arm carrying said stud.

6. A counting mechanism as defined in claim 3, wherein said cam track has, at one end, a region of substantially constant radius from the rocking axis of said rockably mounted member and, towards its other end, decreases in radius from the said rocking axis, said transfer pinion shaft being locked against translatory movement, with the transfer pinion, in its meshing position when said projection is engaged by said region of said cam track, and when said rockably mounted member is moved to a shorter radius region of said cam track into engagement with said projection, said transfer pinion being withdrawn from mesh with said gear means.

References Cited

UNITED STATES PATENTS

| | | | |
|---|---|---|---|
| 54,519 | 5/1866 | Fitzgerald | 74—352 |
| 217,827 | 7/1879 | Stalman | 235—144 |
| 2,907,221 | 10/1959 | Haupt | 74—352 |
| 3,266,332 | 8/1966 | Misson | 74—337.5 |

DONLEY J. STOCKING, *Primary Examiner.*

DAVID J. WILLIAMOWSKY, *Examiner.*

H. S. LAYTON, *Assistant Examiner.*